(12) United States Patent
Blaski et al.

(10) Patent No.: US 8,708,214 B2
(45) Date of Patent: Apr. 29, 2014

(54) SERVO-CONTROLLED ROTATING CLAMPING DEVICE FOR USE WITH A FRICTION STIR SPOT WELDING APPARATUS

(75) Inventors: Bradley J. Blaski, Sterling Heights, MI (US); Robert T. Szymanski, St. Clair Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

(21) Appl. No.: 13/092,177

(22) Filed: Apr. 22, 2011

(65) Prior Publication Data

US 2012/0267419 A1 Oct. 25, 2012

(51) Int. Cl.
*B23K 20/12* (2006.01)
(52) U.S. Cl.
USPC .......................... 228/2.1; 28/112.1
(58) Field of Classification Search
USPC ............................... 228/2.1, 112.1
See application file for complete search history.

(56) References Cited

U.S. PATENT DOCUMENTS

| | | | |
|---|---|---|---|
| 5,876,156 A * | 3/1999 | Yamaura et al. | 408/95 |
| 7,597,237 B2 * | 10/2009 | Ghosh | 228/112.1 |
| 2008/0308236 A1 * | 12/2008 | Chen et al. | 156/514 |
| 2009/0308913 A1 | 12/2009 | Hall et al. | |

* cited by examiner

*Primary Examiner* — Nicholas P D'Aniello
(74) *Attorney, Agent, or Firm* — Quinn Law Group, PLLC

(57) ABSTRACT

A pressure-applying device for use with a welding apparatus includes an annular collar, a housing component, a pressure foot, and a motor. The housing component is coupled with the annular collar and selectively rotatable relative to the annular collar. The pressure foot is at least partially located in the housing component and has a discontinuous contact surface for contacting a work piece and has a central opening for accommodating a welding tool, the discontinuous contact surface may have a first and second contact surface that are respectively disposed on substantially opposing sides of the central opening. The motor is coupled to the housing component and is configured to rotate the housing component with respect to the annular collar.

19 Claims, 3 Drawing Sheets

SERVO-CONTROLLED ROTATING CLAMPING DEVICE FOR USE WITH A FRICTION STIR SPOT WELDING APPARATUS

TECHNICAL FIELD

The present invention relates generally to systems and methods for adjustably clamping working pieces together during friction stir spot welding routines.

BACKGROUND

Friction stir spot welding (FSSW) is a solid-state welding technique that creates a spot weld without melting the work pieces. In an FSSW process, a rotating tool with a contoured tip is plunged against two or more work pieces, such as flat sheet metal pieces, such that the resulting friction joins the work pieces together. During this process, the tip of the rotating tool penetrates through the top work piece and enters into the lower work piece. As the tip of the rotating tool exits the faying surface of the top work piece and enters the faying surface of the lower work piece, the rotating tool can cause the upper work piece to lift off of and undesirably deflect away from the lower work piece.

SUMMARY

A pressure-applying device for use with a welding apparatus may include an annular collar, a housing component, and a pressure foot. The housing component may be coupled with the annular collar and selectively rotatable relative to the annular collar. The pressure foot may be at least partially located in the housing component and have a discontinuous contact surface for contacting and applying a clamping pressure to a work piece. The foot may also have a central opening for accommodating a welding tool, and the discontinuous contact surface may have a first and second contact surface that are respectively disposed on substantially opposing sides of the central opening.

A motor may be coupled to the housing component, such as through a plurality of gears, and may be configured to rotate the housing component with respect to the annular collar. The apparatus may further include a processor that is configured to controllably drive the motor to rotate the housing component. In one configuration, the processor may be configured to reassess the rotational position of the housing component following a relative translation between a part and a welding apparatus.

The pressure-applying device may further include a biasing component that is at least partially located in the housing component and is configured to exert a force against the pressure foot. Additionally, the pressure foot may be rotationally stationary relative to the housing component. The annular collar may be configured to fixably mount the pressure-applying device to a welding apparatus.

In another embodiment, the pressure-applying device may be used with a friction stir spot welding apparatus that may include a welding tool, a rotational drive portion, a support feature, and/or a plunge portion. The rotational drive portion may be coupled to the welding tool and configured to rotate the welding tool during a friction stir spot welding procedure. Similarly, the plunge portion may be configured to drive the welding tool toward the support feature along a depth direction.

The above features and advantages and other features and advantages of the present invention are readily apparent from the following detailed description of the best modes for carrying out the invention when taken in connection with the accompanying drawings.

DETAILED DESCRIPTION

Figure 1:
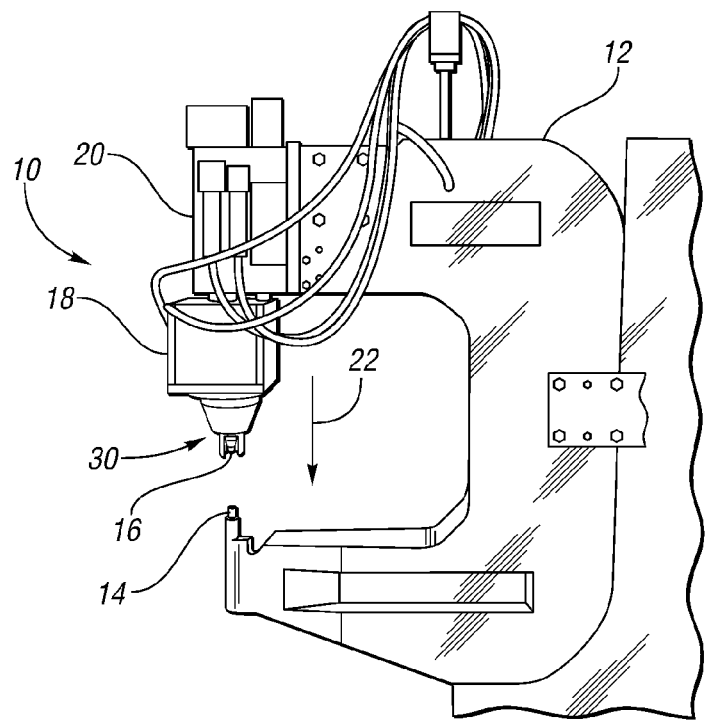
FIG. 1 is a side view of a friction stir spot welding apparatus.

Referring to the drawings, wherein like reference numerals are used to identify like or identical components in the various views, FIG. 1 illustrates a side view of a friction stir spot welding (FSSW) apparatus 10. As shown, the FSSW apparatus 10 may be attached to a welding arm 12 that may generally have a "C"-type shape. The welding arm 12 may also have a welding fixture/support feature 14 disposed on an end of the arm 12 and that substantially opposes the FSSW apparatus 10. The FSSW apparatus may have a rotatable welding tool 16, a rotational drive portion 18, and a plunge portion 20. The rotational drive portion 18 may include, for example, an electric motor that may rotate the welding tool 16 at a high rate of angular speed. During an FSSW procedure, the plunge portion 20 may drive the welding tool toward the support feature 14 along an axial depth direction 22, where it may contact a work piece to be welded.

During the FSSW procedure, a pressure-applying device 30 may be used with a FSSW apparatus 10 to maintain one or more of a plurality of work pieces in a generally flat or flush orientation with respect to additional work pieces. More specifically, the pressure-applying device 30 can be mounted or otherwise attached to the operable end of an FSSW apparatus 10—that is, the portion of the FSSW apparatus 10 located near the welding tool 16—so that it exerts a stabilizing force against an upper work piece to be welded. The stabilizing force exerted by the device 30 may discourage the upper work piece from deflecting when the rotating welding tool 16 of the FSSW apparatus 10 passes through the upper work piece and into the lower work piece. While the present description is provided in the context of an FSSW apparatus 10, it should be appreciated that the pressure-applying device 30 disclosed herein could be used with other types of welding apparatuses known in the art and is not limited to FSSW machines only.

Figure 2:
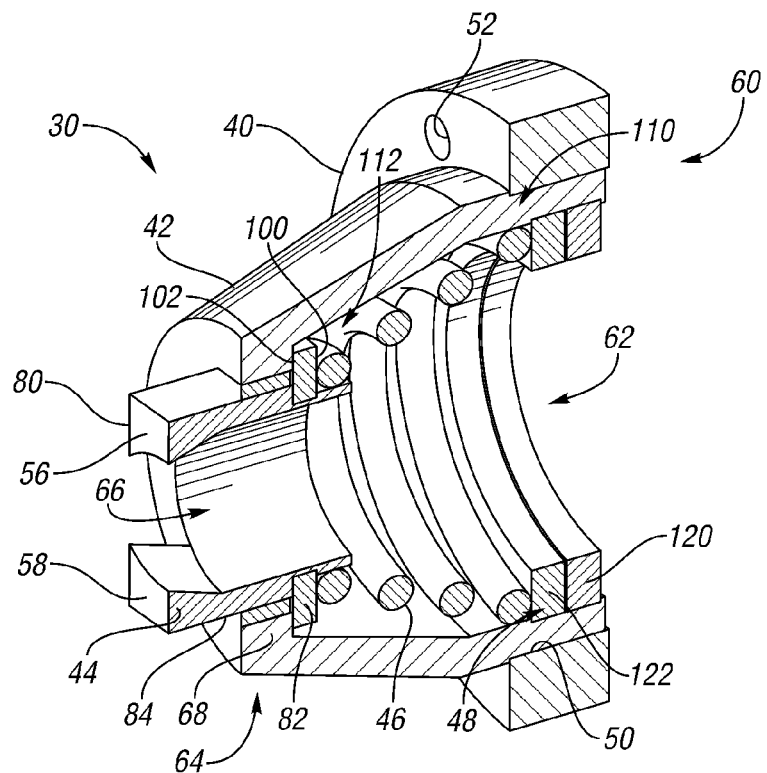
FIG. 2 is a perspective cross-sectional view of an exemplary embodiment of a device that can be used with a friction stir spot welding apparatus.

Turning now to FIG. 2, there is shown an exemplary embodiment of a pressure-applying device 30 that can be used with a welding apparatus, such as the FSSW apparatus 10 provided in FIG. 1. In this particular embodiment, the pressure-applying device 30 is attached to the operable end of the FSSW apparatus (shown at 10 in FIG. 1) and may include an annular collar 40, a housing component 42, a pressure foot 44, a biasing component 46, and/or a backstop 48. It should be recognized that the embodiment illustrated in FIG. 2 is only one possibility, as other embodiments, including those having more, less, or different components than that shown here, could also be used.

As generally illustrated in FIG. 2, the annular collar 40 may be connected to one or more components of the pressure-applying device 30, and may facilitate the attachment of that device 30 to the FSSW apparatus 10. In this particular embodiment, the annular collar 40 may be a ring-shaped component that is configured to surround a housing component 42 at a first end and may include a retaining feature 50 and one or more mounting features 52. The retaining feature 50 may be a thread that circumferentially extends around an inside surface of the annular collar 40 and interacts with complementary threads located on an outside surface of the housing component 42. Alternatively, the retaining feature may be a flange, bearing, or gear that restrains the housing component 42 from moving in an axial direction, though provides for selective rotational movement. Likewise, the one or more mounting features 52 may provide the annular collar 40 with a means to attach to the FSSW apparatus 10. For example, the mounting features 52 may include a number of bolts/bolt holes spaced around the circumference of annular collar 40 that may be used to couple the pressure-applying device 30 with the FSSW apparatus 10.

In one configuration, the housing component 42 may encompass various parts and components of the pressure-applying device 30. The housing component 42 may include a first end 60 with a first opening 62, a second end 64 with a second, central opening 66, and an interior shoulder 68. The first end 60 may be diametrically larger than the second end 64 and may include an end surface that is configured to mate with a mounting plate or other abutment features of the FSSW apparatus 10. The second end 64 may be the outward end of housing component 42 and may generally be concentric with the second opening 66. The actual shape of housing component 42 can vary, but several shapes that may be used include: a non-tapered shape where the housing component is comprised of one or more cylindrical sections extending between the first and second ends 60, 64, a tapered shape (such as that shown in the drawings) where the housing component tapers in a generally conical form from the first end 60 to the second end 64, and/or a curved shape where the housing component tapers in a concave or convex fashion between the first and second ends 60, 64.

Figure 3:
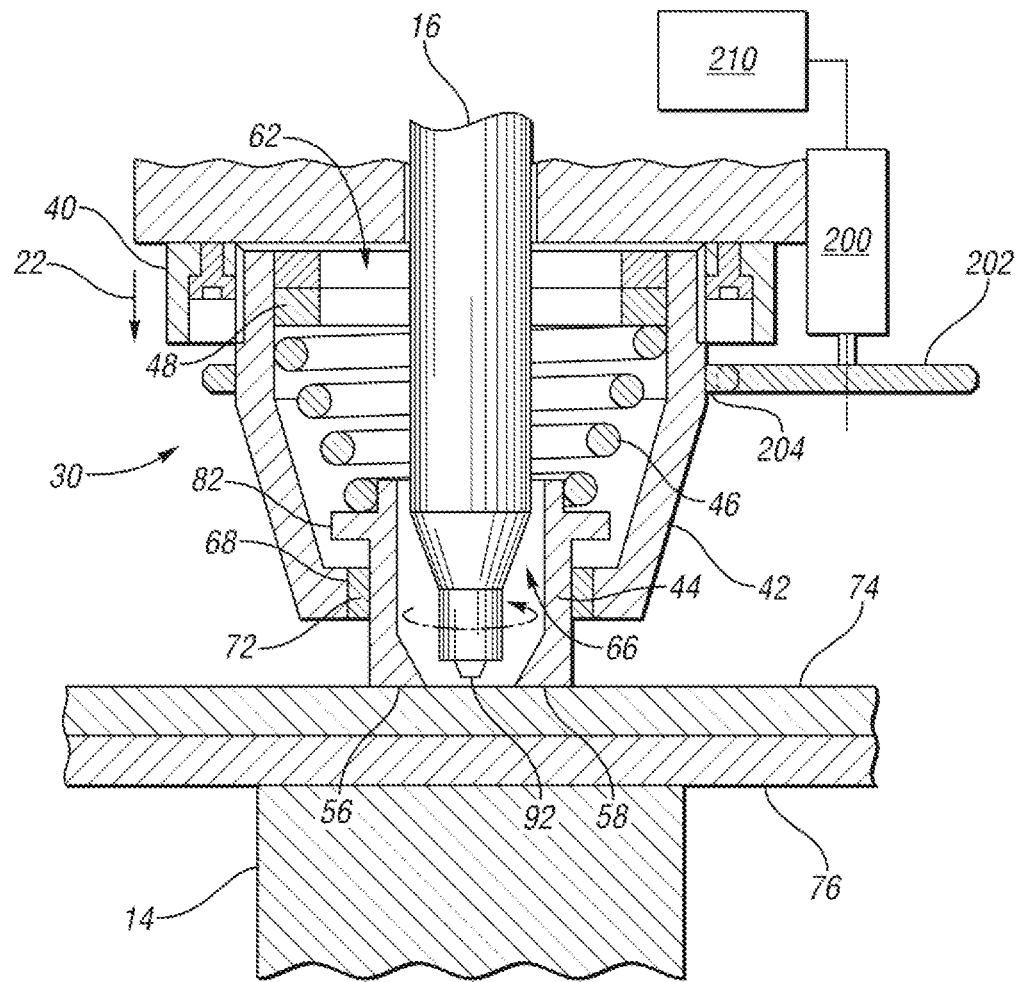
FIG. 3 is a side cut-away view of the exemplary device from FIG. 2, where the device is shown in operation.

As is best seen in FIG. 3, the first and second openings 62, 66 may be designed to accommodate a rotating welding tool 16, which may extend through the openings and be configured to contact one or more work pieces 74, 76. Additionally, the second end 64 may include an optional bushing 72, which may be mounted on the inward facing surface of the second opening 66. The bushing 72 may promote a smooth sliding contact between the housing component 42 and the pressure foot 44. In an alternative embodiment, however, the bushing 72 may be substituted by bearings or other features that may promote movement between two parts. Alternatively, the bushing 72 may be omitted entirely.

Referring again to FIG. 2, the interior shoulder 68 may be located on the inside or interior of housing component 42 and may act as a stop for pressure foot 44. Said another way, the interior shoulder 68 may prevent the pressure foot 44 from being pushed or expelled out of housing component 42 by the biasing component 46. Although the interior shoulder is shown here as a generally uniform, annular shoulder located near the second end 64 of the housing component, it should be appreciated that any feature capable of properly maintaining the pressure foot 44 within the housing component could be used. For example, and without limitation, the annular interior shoulder 68 may be replaced with one or more tabs, stops, tapers, etc., and/or it may be moved further away from second end 64.

The pressure foot 44 may be configured to slide in an axial direction 22 within housing component 42. During the duration of a welding operation, the pressure foot 44 may contact the work piece 74 via a contact surface 80, which may provide a stabilizing and/or clamping force against an upper work piece 74, and may promote adequate material contact. In an embodiment, the pressure foot 44 may have a discontinuous contact surface 80 for contacting the work piece 74 and may share the second, central opening 66 for accommodating a welding tool 16. As shown in FIG. 2, the discontinuous contact surface 80 may include a first and second contact surface 56, 58 that are respectively disposed on substantially opposing sides of the second central opening 66.

The pressure foot 44 may further include a shoulder 82 located within the housing component 42, which may restrain the pressure foot 44 from exiting the housing 42. Likewise, the pressure foot 44 may have a sliding surface 84 that is located between the contact surface 80 and the shoulder 82, which may interface with the adjacent bushing 72. In an embodiment, the pressure foot 44 may be configured to axially slide along direction 22, though may be restrained from any relative rotational movement with respect to the housing component 42 and/or the work piece 74.

With continued reference to FIG. 2, the shoulder 82 may extend outwardly from pressure foot 44 and may be configured to engage the interior shoulder 68 of the housing component. In this configuration, the shoulder 82 may be an annular shoulder or flange that may circumferentially extend around the pressure foot 44 and may be sized and shaped to nest within the space created by the interior shoulder 68. As with interior shoulder 68, the shoulder 82 of the pressure foot 44 should not be limited to an annular shoulder or ring (as shown), but instead may be replaced with one or more tabs, stops, tapers, protrusions, or other features that may perform a similar function. The shoulder 82 may further include an annular surface 100 that may engage a biasing component 46 and/or a second annular surface 102.

The biasing component 46 may exert a force on the pressure foot 44 that urges it in a direction 22 toward a work piece. In the embodiment shown in FIG. 2, the biasing component 46 may include a spring with a first end 110 designed to contact the backstop 48 and a second end 112 that may contact the annular surface 100 of the pressure foot 44. The spring may be tapered to conform to the interior shape of housing component 42, for example, if the housing component 42 is also tapered. As may be appreciated, however, other spring arrangements may also be used. Alternatively, the biasing component 46 may include one of a large number of different types of springs, as well as other non-spring components so long as they are able to exert an appropriate bias force against pressure foot 44.

The backstop 48 provides biasing component 46 with a surface from which it can push off. As generally illustrated in FIG. 2, the backstop 48 may be a two-piece component that may include both a first and second annular ring 120, 122. The first annular ring 120 may include circumferential threads on its exterior that are designed to interact with complementary threads on the interior of housing component 42. In some instances, it may be desirable to permanently attach the first annular ring 120 within the housing component. The second annular ring 122 may also include circumferential threads on its exterior and may be adjustable relative to the housing 42, and, through such adjustment, may vary the amount of biasing force applied to the pressure foot 44.

With reference to FIG. 3, there is shown a pressure-applying device 30 in operation. In this example, an FSSW apparatus 10 uses the rotational drive 18 (shown in FIG. 1) to spin the welding tool 16, and uses a plunge mechanism 20 to advance the rotating tool in an axial direction 22. The FSSW apparatus 10 is advanced until the contact surface 80 of the pressure foot 44 contacts a top surface of an upper work piece 74. Once contact is established, further advancement of the apparatus 10 may cause the pressure foot 44 to be urged into the housing component 42 against the force of the bias component 46. This urging may cause the shoulder 82 of the movable component to lift off the interior shoulder 68 of the housing component. The stabilizing force exerted by the pressure foot 44 cooperates with the support feature 14 located on the opposing side of the work pieces 74, 76 to maintain the work pieces in a flat and/or flush orientation adjacent the weld location. Such forced contact can aid in preventing the faying surfaces of work pieces 74, 76 from deflecting when the contoured tip 92 of rotating tool 16 interfaces with the work pieces 74, 76.

Figure 4:
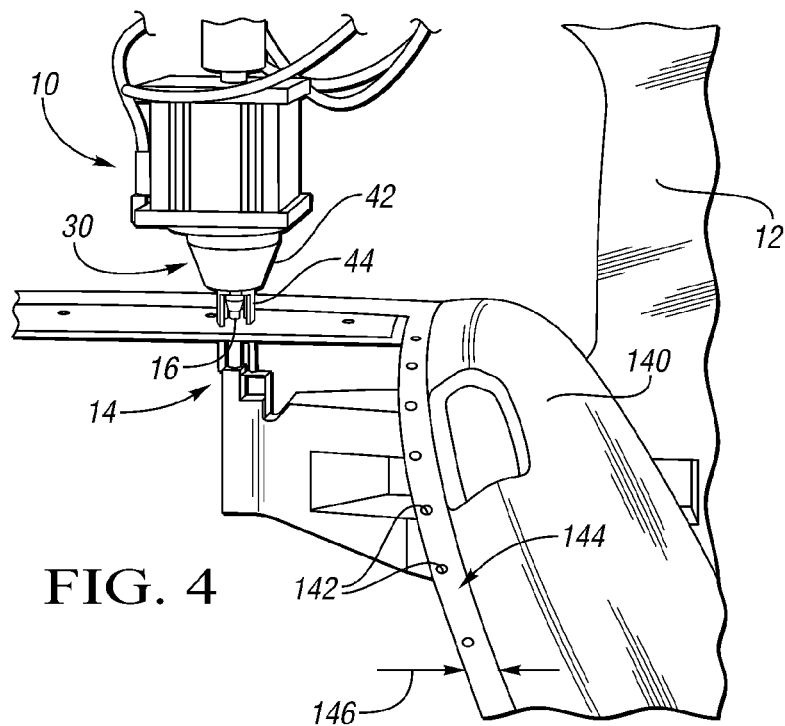
FIG. 4 is a perspective view of a friction stir spot welding apparatus performing a welding operation in a first location on a part.
Figure 5:
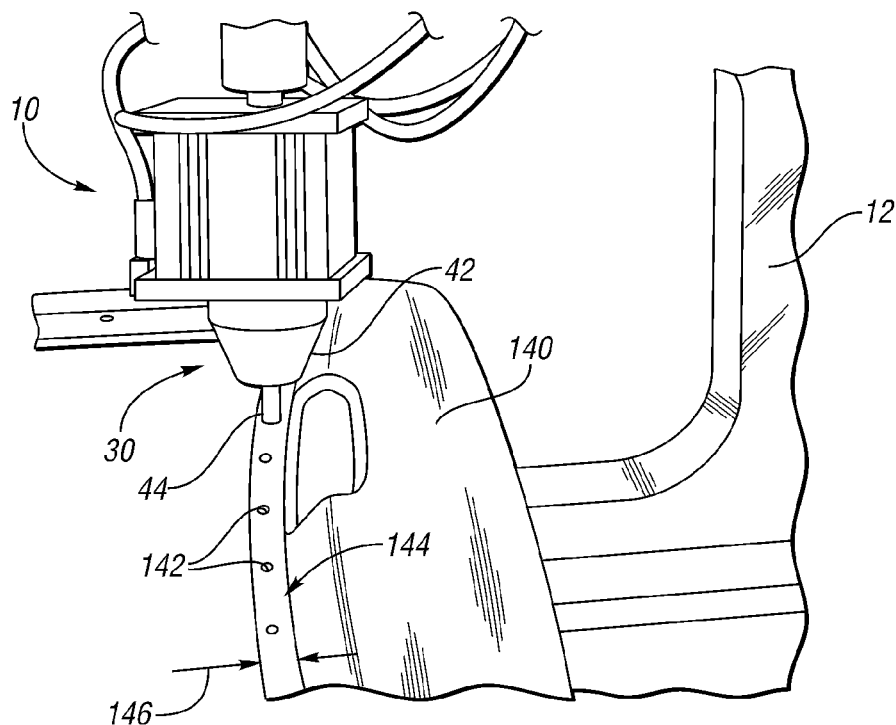
FIG. 5 is a perspective view of the friction stir spot welding apparatus from FIG. 4, performing a welding operation in a second location on a part.

As further illustrated in FIGS. 2-3, the pressure foot 44 may include two separate, discontinuous contact surfaces 56, 58 that may be situated on substantially opposing sides of the welding tool 16. As generally illustrated in FIGS. 4-5, during a sheet metal welding operation to create a part 140, such a split-contact surface arrangement may allow the FSSW apparatus 10 to produce one or more spot welds 142 on a welding flange 144 that has a reduced lateral dimension 146 (as compared with an apparatus where the contact surface 80 circumferentially surrounds the entire welding tool 16—thus requiring a wider flange 144). The narrower welding flange 144 may be facilitated by aligning the two contact surfaces 56, 58 along the longitudinal (i.e., edge-wise) dimension of the flange 144. As may be appreciated, a narrower welding flange 144 may be advantageous in certain design situations.

To facilitate the welding of a part 140 that has a flange 144 extending around a contoured edge, such as shown in FIGS. 4 and 5, a rotatable pressure foot 44 may be employed to reduce the need to re-orient the welding arm 12 while maintaining the alignment of the contact surfaces 56, 58 of the pressure foot 44 along the longitudinal dimension of the flange 144.

Referring again to FIG. 3, as described above, the pressure foot 44 may be rotationally fixed with respect to the housing component 42. By rotating the housing component 42 relative to the annular collar 40, however, the pressure foot 44 may likewise rotate. To facilitate the rotation, a motor 200 may be coupled to the housing component, for example, through one or more rotary members, such as a gear 202. In one configuration, the motor 200 may be a servo-motor that is capable of precise angular control. The motor 200 may drive the gear 202, which may be in communication with an adjoining gear tooth profile 204 surrounding the housing component 42. Alternatively, the motor 200 may be disposed within the housing component 42, with a gear tooth profile 204 facing radially inward. In other configurations, pulleys, belts, or other known rotary drive mechanisms may be used to accomplish a selective and controlled rotation of the housing component 42 and/or the pressure foot 44.

In one configuration, a processor 210 may be coupled to the motor 200 for the purpose of controlling the selective rotation of the motor 200 and coupled housing component 42. For example, the processor 210 may be configured to reassess the rotational position of the housing component 42 and/or pressure foot 44 following a relative translation between the part 140 and the welding apparatus 10. The processor 210 may be embodied, as a server or a host machine, i.e., one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics. In an embodiment, the processor 210 may be in bi-directional communication with the motor 200, and may both command the movement of the motor 200 and/or receive a positional feedback signal from the motor 200 or from an associated position encoding device.

While shown as a single device in FIG. 3 for simplicity and clarity, the processor 210 may include as many different hardware and software components as are required to optimally control the real-time rotation of the housing component 42. The individual control routines/systems resident in the processor 210 or readily accessible thereby may be stored in ROM or other suitable tangible memory location and/or memory device, and automatically executed by associated hardware components of the processor to provide the respective control functionality.

Referring again to FIGS. 4 and 5, a rotating pressure foot 44/housing component 42 may simplify the application of a plurality of spot welds 142 along a contoured flange 144 of a part 140. Such a simplification may result from the reduction in the need to re-orient the welding apparatus 10 with respect to the part 140 for each successive weld. As shown in FIG. 4, the welding apparatus 10 may begin at a first location along the welding flange 144. While in this first position, the pressure foot 44 may be oriented in a direction that is generally parallel to the welding arm 12 and situated along a longitudinal/edgewise dimension of the flange 144 at that position.

After performing the welding operation in this first position, the welding apparatus 10 may be re-positioned with respect to the part 140 to a second location as shown in FIG. 5. Such re-positioning may comprise a relative translation between the part 140 and the welding apparatus 10. The translation may be a Cartesian translation, and may be distinct from a re-orientation of the welding apparatus 10, which may involve a relative angular rotation. To maintain an orientation along the longitudinal/edgewise dimension of the flange 144, the pressure foot 44 may rotate to a second position that may then be generally perpendicular to the welding arm 12. As may be appreciated, the pressure foot 44 may be configured to assume any rotational posture that may be required by the geometry of the part 140, and should not be limited to merely the positions illustrated in FIGS. 4 and 5. By rotating the pressure foot 44, the welding apparatus 10 may allow for a narrow flange 144, while also reducing the amount of welding arm 12 and/or part 140 manipulation that may be required to properly align the foot 44 along the flange 144.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A pressure-applying device coupled with a welding apparatus having a rotatable welding tool, the pressure-applying device comprising:
    an annular collar;
    a housing component circumferentially disposed about the rotatable welding tool and both coupled with the annular collar and selectively rotatable relative to the annular collar;

a pressure foot being at least partially located in the housing component and having a discontinuous contact surface for contacting a work piece and a central opening for accommodating the rotatable welding tool, the discontinuous contact surface having at least a first and second contact surface that are respectively disposed on substantially opposing sides of the central opening; and a motor coupled directly to the housing component via a gear, the motor being configured to rotate the housing component about an axis of the rotatable welding tool and with respect to the annular collar, wherein the rotation of the housing component is separate from the rotation of the rotatable welding tool.

2. The pressure-applying device of claim 1, further comprising a biasing component being at least partially located in the housing component and configured to exert a force against the pressure foot.

3. The pressure-applying device of claim 1, wherein the motor is coupled to the housing component through one or more gear members.

4. The pressure-applying device of claim 1, wherein the pressure foot is rotationally stationary relative to the housing component.

5. The pressure-applying device of claim 1, further comprising a processor, the processor being configured to controllably drive the motor to rotate the housing component.

6. The pressure-applying device of claim 5, wherein the processor is configured to reassess the rotational position of the housing component following a relative translation between a part being welded and the welding apparatus.

7. The pressure-applying device of claim 1, wherein the annular collar is configured for fixably mounting the pressure-applying device to the welding apparatus.

8. The pressure-applying device of claim 7, wherein the housing component is a single unitary piece that tapers from a larger first end adjacent the annular collar to a smaller second end adjacent the pressure foot.

9. A friction stir spot welding apparatus comprising:
a rotatable welding tool;
a rotational drive portion coupled to the rotatable welding tool and configured to rotate the rotatable welding tool;
an annular collar coupled to the rotational drive portion;
a housing component circumferentially disposed about the rotatable welding tool and both coupled with the annular collar and selectively rotatable relative to the annular collar;
a pressure foot being at least partially located in the housing component and having a discontinuous contact surface for contacting a work piece and a central opening for accommodating the rotatable welding tool, the discontinuous contact surface having at least a first and second contact surface that are respectively disposed on substantially opposing sides of the central opening; and
a motor coupled directly to the housing component via a gear, the motor configured to rotate the housing component about an axis of the rotatable welding tool and with respect to the annular collar, wherein the rotation of the housing component is separate from the rotation of the rotatable welding tool.

10. The friction stir spot welding apparatus of claim 9, wherein the motor is coupled to the housing component through one or more gear members.

11. The friction stir spot welding apparatus of claim 9, wherein the pressure foot is rotationally stationary relative to the housing component.

12. The friction stir spot welding apparatus of claim 9, further comprising a processor, the processor being configured to controllably drive the motor to rotate the housing component.

13. The friction stir spot welding apparatus of claim 12, wherein the processor is configured to reassess the rotational position of the housing component following a relative translation between a part being welded and the welding apparatus.

14. The friction stir spot welding apparatus of claim 9, further comprising a support feature and a plunge portion, the plunge portion configured to drive the welding tool toward the support feature along a depth direction.

15. The friction stir spot welding apparatus of claim 14, further comprising a biasing component being at least partially located in the housing component and configured to exert a force against the pressure foot that is substantially aligned with the depth direction.

16. The friction stir spot welding apparatus of claim 15, further comprising a two-piece backstop that includes a stationary annular component attached to the housing component, and an adjustable annular component configured to vary the force exerted by the biasing component.

17. A friction stir spot welding apparatus comprising:
a rotatable welding tool;
a rotational drive portion coupled to the rotatable welding tool and configured to rotate the rotatable welding tool;
a support feature and a plunge portion, the plunge portion configured to drive the rotatable welding tool toward the support feature along a depth direction;
an annular collar coupled to the rotational drive portion;
a housing component circumferentially disposed about the rotatable welding tool and both coupled with the annular collar and selectively rotatable relative to the annular collar;
a pressure foot being at least partially located in the housing component and having a discontinuous contact surface for contacting a work piece and a central opening for accommodating the rotatable welding tool, the discontinuous contact surface having at least a first and second contact surface that are respectively disposed on substantially opposing sides of the central opening, the pressure foot being rotationally stationary relative to the housing component;
a motor coupled directly to the housing component via a gear, the motor configured to rotate the housing component about an axis of the welding tool and with respect to the annular collar, wherein the rotation of the housing component is separate from the rotation of the rotatable welding tool; and
a processor configured to controllably drive the motor to rotate the housing component.

18. The friction stir spot welding apparatus of claim 17, further comprising a biasing component being at least partially located in the housing component and configured to exert a force against the pressure foot that is substantially aligned with the depth direction.

19. The friction stir spot welding apparatus of claim 17, wherein the processor is configured to reassess the rotational position of the housing component following a relative translation between a part being welded and the welding apparatus.

* * * * *